United States Patent [19]

Tsubuko et al.

[11] 4,087,393

[45] May 2, 1978

[54] NON-AQUEOUS RESIN DISPERSION AND METHOD OF MANUFACTURING THEREOF

[75] Inventors: Kazuo Tsubuko; Kenichi Matsubayashi; Tsuneo Kurotori, all of Tokyo, Japan

[73] Assignee: Ricoh Co., Ltd., Tokyo, Japan

[21] Appl. No.: 739,523

[22] Filed: Nov. 8, 1976

[30] Foreign Application Priority Data

Nov. 20, 1975 Japan .................................. 50-139392

[51] Int. Cl.² .......................... C08K 5/01; C08K 5/02; C08L 93/00
[52] U.S. Cl. .............................. 260/27 R; 260/28.5 R; 260/33.6 UA; 260/33.8 UA
[58] Field of Search ..... 260/27 R, 33.6 UA, 33.8 UA

[56] References Cited

U.S. PATENT DOCUMENTS

| | | | |
|---|---|---|---|
| 2,636,871 | 4/1953 | James et al. | 260/27 R |
| 2,636,872 | 4/1953 | James et al. | 260/27 R |
| 3,985,700 | 10/1976 | Nicks et al. | 260/33.6 R |
| 3,997,488 | 12/1976 | Tsubuko et al. | 260/28.5 A |

*Primary Examiner*—Donald E. Czaja
*Assistant Examiner*—H. H. Fletcher
*Attorney, Agent, or Firm*—Blanchard, Flynn, Thiel, Boutell & Tanis

[57] ABSTRACT

A non-aqueous resin dispersion is obtained by dissolving a resin, which is substantially insoluble in non-aqueous solvents, in at least one monomer which can dissolve said resin, subjecting the resulting solution to polymerization reaction in the presence or in the absence of non-aqueous solvent, and if necessary, adding a non-aqueous solvent to the reaction product. The non-aqueous resin dispersion is useful as a coating material or as a liquid developer for use in electrophotography.

29 Claims, No Drawings

NON-AQUEOUS RESIN DISPERSION AND METHOD OF MANUFACTURING THEREOF

BACKGROUND OF THE INVENTION (a) Field of the Invention

The present invention relates to a non-aqueous resin dispersion useful in preparing coating materials and toners for electrophotography.

(b) Description of the Prior Art

One of the present inventors Kazuo Tsubuko, together with Eiichi Kawamura, previously proposed a method of manufacturing a non-aqueous latex of thermoplastic resin in U.S. Ser. No. 602,103, now U.S. Pat. No. 3,997,488. This method is for the purpose of manufacturing a non-aqueous latex of thermoplastic resin, which is considered to have nuclei nucleus consisting of wax or polyethylene, from acrylic ester monomer through the procedure comprising (1) the step of polymerization, (2) the step of esterification, (3) the step of grafting and (4) the step of cooling and adsorption, in that order, in the presence of a non-aqueous solvent (namely, aliphatic hydrocarbon or halogen derivative thereof), wherein wax or polyethylene having a softening temperature of 60° – 130° C is added during to any one of said steps so as to be dissolved in the reaction mixture and is quenched thereafter. However, this method is defective in that it comprises so many reaction steps that much time is required for the reaction, the productivity is low, and particularly in the esterification step as well as the grafting step, the yield is low and the irregularity of the reaction product is conspicuous, entailing lack of uniformity in the yield and properties of the final products.

SUMMARY OF THE INVENTION

A principal object of the present invention is to provide a method of manufacturing a non-aqueous resin dispersion, which simplifies the manufacturing process, reduces the time for the reaction, achieves a high productivity and produces a non-aqueous resin dispersion with minimum irregularity at a high yield.

Another object of the present invention is to provide a non-aqueous resin dispersion which is excellent in the stability of the dispersion, fixability, coatability, etc.

The method of manufacturing a non-aqueous resin dispersion according to the present invention comprises dissolving a resin which is substantially insoluble in non-aqueous solvents in at least one monomer which can dissolve said resin, subjecting the resulting solution to a polymerization reaction in the presence or in the absence of non-aqueous solvent, and if necessary, adding a non-aqueous solvent to the polymerization product.

Further, a non-aqueous resin dispersion according to the present invention comprises a non-aqueous solvent, at least one resin which is substantially insoluble in said solvent, and a polymer obtained from at least one monomer which can dissolve said resin.

The wording 'substantially insoluble' herein means 'utterly insoluble' or 'hardly soluble'.

In short, the method of the present invention is characterized in that a resins which is substantially insoluble in a non-aqueous solvent and which is to be contained in the desired product, is dissolved in a monomer and thereafter said monomer is polymerized.

Provided that conformity with the foregoing objects is maintained, modification of other conditions in various ways is allowed. For instance, it is satisfactory to effect polymerization of the monomer while adding dropwise a monomer solution prepared by dissolving a monomer desired said non-aqueous solvent, or it will do to obtain the object dispersion by a process in which polymerization is effected upon adding a non-aqueous solvent in such an amount as will not give rise to separation of the resin to a monomer solution or is effected directly without adding any non-aqueous solvent at all and thereafter the resulting polymerized mixture is dispersed in a non-aqueous solution.

Furthermore, a dispersion according to the present invention may contain waxlike substances or polyolefins having a softening temperature in the range of about 60° - 130° C; in this case, by virtue of adding these substances to the reaction system, to wit, a monomer solution prior to polymerization or a dispersion in the course of polymerization or resulting from polymerization, dispersibility thereof can be further enhanced.

As for the method for polymerization, it can be selected from various methods: in the case of polymerization by heating, it is preferable to effect it at a temperature of about 70° – 110° C in the presence of a conventional polymerization initiator such as benzoyl peroxide or azobisisobutyronitrile dissolved in a monomer solution or a non-aqueous solvent.

The starting materials resin and monomer can be used either individually or upon combining two or more kinds thereof respectively. Inasmuch as the resin for use in the present invention is insoluble in non-aqeuous solvents, it comes to be separated within the dispersion after polymerization of the monomer, while the resulting polymer is in the state of being solvated with non-aqueous solvent.

In this way, a dispersion which comprises a resin separated from the non-aqueous solvent and substantially insoluble in said solvent and a polymer solvated with the non-aqueous solvent is obtained. The resin contained in this dispersion and substantially insoluble in the non-aqueous solvent acts as a dispersion stabilizer too. Although it depends on the kind and amount of the material employed and the conditions for polymerization (e.g., temperature, stirring, cooling, etc.), as a rule, a polymer capable of being solvated with non-aqueous solvents, said polymer being hereinafter referred to as "solvatable polymer", is good in dispersion stability because it has a small grain size and approximates the dispersion medium in specific gravity, so that it hardly coagulates and, for instance, it can be stable for more than 1 year within a dispersion comprising 15% of solid matter. Further, inasmuch as the solvatable polymer has a dispersion stabilizing effect, a polarity controlling effect and fixability and is easily adsorbed onto various pigments such as $TiO_2$, $CaCO_3$, $SiO_2$, carbon, etc., it not only maintains the polarity of the pigment distinctly and makes the pigments disperse stably within non-aqueous solvents but also adheres firmly to paper, plastic plate, metal plate, etc., so that it is most suitable for use in preparing toner or coating material for electrophotography.

Besides, the property of the solvatable polymer can be altered by using it jointly with the aforesaid waxlike substances or polyolefins or monomers such as described in the following. In this connection, it has been found that in the case where the solvatable polymer is used jointly with a waxlike substance or polyolefin, these substances are separated in the form of fine particles within the polymerization system when quenched, and at the same time of said separation, they are adsorbed onto said polymer (or copolymer) and dispersed, whereby the dispersibility of the dispersion can be more effectively enhanced.

To cite applicable resins substantially insoluble in non-aqueous solvents, natural resins such as ester gum, hardened rosin, etc. and natural resin modified thermosetting resins such as natural resin modified maleic resin, natural resin modified phenol resin, natural resin modified polyester resin, natural resin modified pentaerythritol resin, etc. are appropriate, and at least one of these resins is employed in the present invention. As the commercial resins of this kind, the following ones can be cited.

EXAMPLES OF NATURAL RESIN MODIFIED MALEIC RESIN

MRG, MRG-411, MRG-S, MRG-H, MRP, MRA-L, MRM-42, MRM-53 (the foregoing are products of TOKUSHIMA SEIYU K.K.), BECKASITE 1110, BECKASITE 1111, BECKASITE F231, BECKASITE J811, BECKASITE 1120, BECKASITE P-720, BECKASITE J-896 (the foregoing are products of DAINIPPON INK KAGAKU K.K.)

EXAMPLES OF NATURAL RESIN MODIFIED PHENOL RESIN

PRG, PRP, SPR-N, SPR-A, SPR-H (the foregoing are products of TOKUSHIMA SEIYU K.K.), BECKASITE 1100, BECKASITE 1123, BECKASITE 1126, BECKASITE F-171, (the foregoing are products of DAINIPPON INK KAGAKU K.K.)

EXAMPLES OF NATURAL RESIN MODIFIED PENTAERYTHRITOL RESIN

PENTASITE P-406, PENTASITE P-423 (both are the products of DAINIPPON INK KAGUKU K.K.)

EXAMPLES OF NATURAL RESIN MODIFIED POLYESTER RESIN

RM-1000, RM-1300, RM-4090, RM-4100 (the foregoing are products of TOKUSHIMA SEIYU K.K.)

EXAMPLES OF ESTER GUM

EG-8000, EG-9000, HG-H, PE, PE-H (the foregoing are products of TOKUSHIMA SEIYU K.K.)

EXAMPLES OF HARDENED ROSIN

TLR-21, TLR-57 (both are products of TOKUSHIMA SEIYU K.K.)

Next, as the monomer used to make the solvatable polymer (or copolymer), vinyl monomers expressed by the general formula

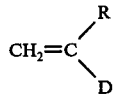

{wherein R represents —H or $CH_3$ group and D represents —$COOC_nH_{2n+1}$ or —$OC_nH_{2n+1}$ group (wherein $n$ is an integer ranging from 6 to 20)} (e.g., stearyl, lauryl, 2-ethyl hexyl or hexyl ester of acrylic acid or methacrylic acid; t-butyl methacrylate; cetyl methacrylate; octyl methacrylate; vinyl stearate) (hereinafter called 'monomer A') can be cited. This monomer A can be used upon mixing it with at least one member of the group consisting of glycidyl acrylate, glycidyl methacrylate, propylene glycol monoacrylate, propylene glycol methacrylate, hydroxyethyl methacrylate, acrylonitrile and methacrylonitrile (hereinafter called 'monomer B'). Moreover, after polymerizing monomer A, copolymerization may be effected by adding monomer B. The above cited monomer B dissolves said resins which are substantially insoluble in non-aqueous solvents and is copolymerizable with monomer A in the presence of a polymerization initiator, but in the case where monomer B alone is polymerized, the resulting polymer cannot be solvated with non-aqueous solvents. The appropriate mixing ratio of monomer A to monomer B is in the range of 70-99:30-1 or thereabouts (by weight). Further, in the present invention, the mixture of monomer A and monomer B can be applied upon mixing with at least one member of the group consisting of acrylic acid, methacrylic acid, lower alkyl ester of these acids (having 1 – 4 carbon atoms), styrene, methyl styrene, vinyl toluene and vinyl acetate (hereinafter called 'monomer C'). It also will suffice to effect polymerization by adding monomer C after polymerizing monomer A or a mixture of monomer A and monomer B. The monomer C, like monomer B, can dissolve resins substantially insoluble in non-aqueous solvents, and is polymerizable with monomer A and/or monomer B in the presence of a polymerization initiator. The appropriate mixing ratios of monomer A:monomer B:monomer C is in the range of 60-90:20-1:20-1 or thereabouts by weight, the appropriate ratio of monomer A:monomer C being 50-90:50-10 or thereabouts by weight.

The appropriate mixing ratio of a resin substantially insoluble in non-aqueous solvents to monomer A (or a mixture of monomer A and monomer B and/or monomer C) is in the range of 5-50:50-95 or thereabouts by weight, but it can be modified in various ways according to the intended use of the final product.

Because monomer A can solvate with non-aqueous solvents after polymerization, resins insoluble in non-aqueous solvents can be dispersed stably in non-aqueous solvents. Further, monomer B copolymerizes with monomer A, but because it has polar groups (such as glycidyl group, hydroxyl group, etc.) and also there take place reactions other than copolymerization, e.g., bridging reaction between the copolymer of monomer B and monomer A and the resin insoluble in non-aqueous solvent or monomer C, esterification reaction, etc., it is considered helpful to effect chemical coupling between the solvatable ingredient and the non-solvatable ingredient, rendering it possible to prepare a stable dispersion.

Monomer C substantially copolymerizes with monomer A or a mixture of monomer A and monomer B, but because the polymer of monomer C is insoluble in non-aqueous solvents, it is considered that monomer C copolymerizes with monomer A and/or monomer B in the state of being dissolved in the aforesaid resin insoluble in non-aqueous solvents and further copolymerizes with a solvatable polymer, thereby performing its role as the nuclear ingredient of the solvatable polymer.

As described above, in the present invention, the use of monomer A is a must, and besides, this monomer A can be used jointly with monomer B and/or monomer C for the purpose of realizing the foregoing effects.

Moreover, in the case of using monomer A jointly with monomer B and/or monomer C for this purpose, by virtue of adding waxlike substance or polyolefin having a softening temperature in the range of 60° – 130° C to the polymerization system to dissolve therein and quenching the resulting dispersion upon completion of the reaction, (1) improvement of the stability of the dispersion, (2) control of the redispersibility of the dispersion, (3) control of the viscosity of the dispersion and (4) control of the grain size of the dispersed particles can be effectively performed, and also on the occasion of dispersing pigments in the product dispersion in order to use it as a coating material or a toner for electrophotography, a satisfactory dispersibility of pigments can be expected.

To cite applicable non-aqueous solvents, there are aliphatic hydrocarbons such as n-hexane, n-pentane, isododecane, isooctane, etc. (including such commercial non-aqueous solvents as ISOPAR H, ISOPAR G, ISOPAR L and ISOPAR E manufactured by EXXON Inc., SHELLSOL 71 manufactured by SHELL OIL Inc., etc.) and halogenated hydrocarbons such as carbon tetrachloride, perchloroethylene, etc. The amount of non-aqueous solvent to be applied can be modified in various ways according to the intended use of the final product.

Commercial polyethylenes among the applicable waxlike substances or polyolefins are as follows:

| Examples of polyethylene | | |
|---|---|---|
| name of maker | trade name | softening point (° C) |
| UNION CARBIDE Inc. (U.S.) | DYNI | 102 |
| " | DYNF | 102 |
| " | DYNH | 102 |
| " | DYNJ | 102 |
| " | DYNK | 102 |
| MONSANTO Inc. (U.S.) | ORLIZON 805 | 116 |
| " | ORLIZON 705 | 116 |
| " | ORLIZON 50 | 126 |
| PHILIPS Inc. (U.S.) | MARLEX 1005 | 92 |
| DU PONT Inc. (U.S.) | ALATHON-3 | 103 |
| " | ALATHON-10 | 96 |
| " | ALATHON-12 | 84 |
| " | ALATHON-14 | 80 |
| " | ALATHON-16 | 95 |
| " | ALATHON-20 | 86 |
| " | ALATHON-22 | 84 |
| " | ALATHON-25 | 96 |
| ALLIED CHEMICAL Inc. (U.S.) | AC-POLYETHYLENE 1702 | 98 |
| " | AC-POLYETHYLENE 6 & 6A | 102 |
| " | AC-POLYETHYLENE 615 | 105 |
| SANYO KASEI K.K. | SANWAX 131-P | 108 |
| " | SANWAX 151-P | 107 |
| " | SANWAX 161-P | 111 |
| " | SANWAX 165-P | 107 |
| " | SANWAX 171-P | 105 |
| " | SANWAX E-200 | 95 |
| JUNSEI KAGAKU K.K. | PARAFFIN WAX | 60 – 98 |
| KOBAYASHI KAKO K.K. | BLEACHED BEESWAX | 65 |
| " | CETANOL | 80 |
| NAGAI KAKO K.K. | BLEACHED BEESWAX | 65 |
| SEITETSU KAGAKU K.K. | FROSEN | 110 |

These waxes and polyethylenes are usually applied in an amount of about 10 – 50 parts by weight based on 100 parts by weight of the monomer constituting the aforesaid polymer or copolymer, but this amount can be modified in various ways according to the intended use of the final product.

The merits of the present invention can be summarized as follows.

(1) The manufacturing process for preparing the dispersed resin or resin dispersion is simple, and the manufacture of a uniformly dispersed resin or a resin dispersion can be performed stably.

(2) The dispersed resin is generally small in grain size, and superior in dispersion stability, polarity controllability and adhesion (or fixability).

DESCRIPTION OF THE PREFERRED EMBODIMENTS

Example 1

300g of ISOPAR H were put in a three-nozzle receptacle, equipped with a stirrer, a thermometer and a reflux condenser, having a capacity of 1.6l and heated up to 90° C. Meanwhile, 80g of BECKASITE F-171 were dissolved in 200g of 2-ethyl hexyl methacrylate, and further 2g of azobisisobutyronitrile were mixed with the resulting solution. The thus obtained mixture was dropped into the foregoing receptacle over 4 hours' period to effect polymerization, and by further stirring for 1 hour thereafter, a resin dispersion containing 48.3% of solid matter was prepared.

Example 2

300g of isooctane were put in the same receptacle as used in Example 1 and heated up to 90° C. Meanwhile, 50g of BECKASITE J811 were dissolved in 200g of stearyl methacrylate and then 2g of benzoyl peroxide were mixed with the resulting solution. Subsequently, the thus obtained mixture was dropped into the foregoing receptacle over 2.5 hours' period to effect polymerization, and by heating for about 11 hours thereafter, a resin dispersion containing 46.8% of solid matter was prepared.

Example 3

400g of ISOPAR L were put in the same receptacle as used in Example 1, and heated up to 90° C. Meanwhile, 80g of PENTASITE P-406 were dissolved in a blended monomer consisting of 18g of glycidyl methacrylate and 10g of acrylic acid and then 2g of benzoyl peroxide were mixed with the resulting solution. Subsequently, the thus obtained mixture was dropped into the foregoing receptacle over 4 hours' period to effect polymerization, whereby a resin dispersion containing 40% of solid matter was prepared.

Example 4

Through the same procedure as in Example 1 save for dissolving 25g of ORLIZON 705 in 300g of ISOPAR H and quenching the receptacle (which had been heated up to 90° C) with cooling water upon completion of the polymerization, a polyethylene-containing resin dispersion having 47.1% of solid content was prepared.

Example 5

Through the same procedure as in Example 3 save for adding paraffin wax having a softening point of 80° C to the polymerization system at the time of completion of the polymerization, dissolving it by heating up to 90° C, stirring thoroughly, and quenching the receptacle with tap water, a paraffin wax-containing resin dispersion having 35% of solid content was prepared.

Example 6

300g of isooctane were put in the same receptacle as used in Example 1 and heated up to 90° C. Meanwhile, 100g of BECKASITE J896 were dissolved in a blended monomer consisting of 200g of 2-ethyl hexyl methacrylate and 10g of glycidyl methacrylate and then 2g of benzoyl peroxide were mixed with the resulting solution. Subsequently, by dropping the thus obtained mixture into the foregoing receptacle over 3 hours' period to effect polymerization, maintaining the receptacle at the foregoing temperature in order to complete the reaction and then adding 3g of methacrylic acid thereto, 18 hours' reaction at 90° C was effected. Next, after adding 500g of isooctane to this reaction system, by further adding thereto a mixture consisting of 50g of methyl methacrylate and 3g of benzoyl peroxide dropwise over 3 hours' period and effecting 5 hours' reaction in succession, a resin dispersion was prepared.

Example 7

Through the same procedure as in Example 6 save for further adding 30g of SANWAX 131-P to 500g of isooctane and quenching the receptacle (which had been heated up to 90° C) with tap water after reaction, a polyethylene-containing resin dispersion was prepared.

Example 8

300g of ISOPAR G were put in the same receptacle as used in Example 1 and heated up to 90° C. Meanwhile, 50g of PENTASITE P-423 were dissolved in 200g of stearyl methacrylate. By dropping the resulting solution into the foregoing receptacle over 4 hours' period, effecting reaction for 15 hours at 90° C in succession, adding 500g of ISOPAR G thereafter, and further adding a mixture consisting of 50g of methyl methacrylate and 4g of azobisisobutyronitrile dropwise over 3 hours' period at 90° C thereby completing the reaction, a resin dispersion containing 28.4% of solid matter was prepared.

Example 9

Through the same procedure as in Example 8 save for adding 30g of SANWAX 165-P to 300g of ISOPAR G, a polyethylene-containing resin dispersion was prepared.

Example 10

Through the same procedure as in Example 8 save for omission of methyl methacrylate in effecting the reaction, a resin dispersion was prepared.

Example 11

Upon putting 70g of lauryl methacrylate and 10g of glycidyl methacrylate in the same receptacle as used in Example 1, 20g of BECKASITE F-231 were dissolved therein. After heating the resulting solution up to 90° C, by adding 1.5g of benzoyl peroxide and effecting 8 hours' polymerization, and thereafter adding 100g of ISOPAR H to the reaction product, a resin dispersion containing 50% of solid matter was prepared.

Example 12

By adding 15g of methacrylic acid to 200g of the resin obtained in Example 11 and effecting polymerization for 15 hours at 90° C, a resin dispersion containing 54% of solid matter was prepared.

Example 13

After adding 200g of ISOPAR H to 200G of the resin obtained in Example 12 and heating the mixture up to 90° C, by adding 50g of the low molecular weight polyethylene SANWAX 171-P to dissolve therein and quenching with tap water thereafter, a resin dispersion containing 31% of solid matter was prepared.

What is claimed is:

1. A non-aqueous resin dispersion comprising a non-aqueous solvent selected from the group consisting of aliphatic hydrocarbons and halogen derivatives thereof, at least one resin which is substantially insoluble in said solvent, said resin being selected from the group consisting of natural resins and natural resin-modified thermosetting resins, and a polymer obtained by polymerizing at least one monomer A, wherein said monomer A has the formula

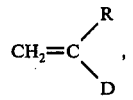

wherein R is hydrogen or $CH_3$, D is $-COOC_nH_{2n+1}$ or $-OC_nH_{2n+1}$ or and $n$ is an integer ranging from 6 to 20, and which monomer A is capable of dissolving said resin, the weight ratio of said resin: said polymer being in the range of from about 5-50:50-95, said polymer being solvated with said solvent.

2. A dispersion according to claim 1, which further comprises at least one dispersant selected from the group consisting of waxlike substances and polyolefins having a softening temperature in the range of 60° – 130° C, wherein the amount of said dispersant is in the range of 10 – 50 parts by weight per 100 parts by weight of said polymer.

3. A dispersion according to claim 1, wherein said polymer is a copolymer of monomer A and at least one monomer B selected from the group consisting of glycidyl methacrylate, glycidyl acrylate, propylene glycol monoacrylate, propylene glycol methacrylate, hydroxyethyl methacrylate, acrylonitrile and methacrylonitrile, wherein the weight ratio of said monomer A to said monomer B is in the range of about 70-99:30-1.

4. A dispersion according to claim 1, wherein said polymer is a copolymer of monomer A and at least one monomer C selected from the group consisting of acrylic acid, methacrylic acid, lower alkyl esters of acrylic acid and methacrylic acid in which said alkyl has 1 – 4 carbon atoms, styrene, methyl styrene, vinyl toluene and vinyl acetate, wherein the weight ratio of monomer A:monomer C is in the range of about 50–90:-50–10.

5. A dispersion according to claim 1 wherein said polymer is a terpolymer of monomer A, monomer B and monomer C, wherein monomer B is at least one monomer selected from the group consisting of glycidyl methacrylate, glycidyl acrylate, propylene glycol monoacrylate, propylene glycol methacrylate, hydroxyethyl methacrylate, acrylonitrile and methacrylonitrile, wherein monomer C is at least one monomer selected from the group consisting of acrylic acid, methacrylic acid, lower alkyl esters of acrylic acid and methacrylic acid in which said alkyl has 1 – 4 carbon atoms, styrene, methyl styrene, vinyl toluene and vinyl acetate, and wherein the weight ratio of monomer A:monomer B:monomer C is in the range of about 60–90:20–1:20–1.

6. A method of manufacturing a non-aqueous resin dispersion, which comprises dissolving a resin selected from the group consisting of natural resins and natural resin-modified thermosetting resins in at least one monomer A, wherein said monomer A has the formula

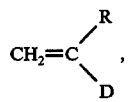

wherein R is hydrogen or $CH_3$, D is $-COOC_nH_{2n+1}$ or $-OC_nH_{2n+1}$ or and $n$ is an integer ranging from 6 to 20, and which can dissolve said resin, and effecting polymerization reaction of the resulting solution in the presence of a non-aqueous solvent, whereby to form a polymer of said monomer A, said non-aqueous solvent being selected from the group consisting of aliphatic hydrocarbons and halogen derivatives thereof, said resin being substantially insoluble in said non-aqueous solvent, the weight ratio of said resin: said polymer being in the range of 5–50:50–95, and said polymer being solvated in said non-aqueous solvent.

7. A method according to claim 6, which comprises adding to said solution during the course of the polymerization reaction at least one dispersant selected from the group consisting of waxlike substances and polyolefins having a softening temperature in the range of 60° – 130° C, wherein the amount of said dispersant added is in the range of 10 – 50 parts by weight per 100 parts by weight of said polymer and quenching said solution after finishing the polymerization reaction.

8. A method according to claim 6, wherein said monomer A is polymerized with at least one monomer B selected from the group consisting of glycidyl methacrylate, glycidyl acrylate, propylene glycol monoacrylate, propylene glycol methacrylate, hydroxyethyl methacrylate, acrylonitrile and methacrylonitrile, wherein the weight ratio of monomer A to monomer B is in the range of about 70–99:30–1.

9. A method according to claim 6, wherein said monomer A is polymerized with at least one monomer C selected from the group consisting of acrylic acid, methacrylic acid, lower alkyl esters of acrylic acid and methacrylic acid wherein said alkyl has 1 – 4 carbon atoms, styrene, methyl styrene, vinyl toluene and vinyl acetate, wherein the weight ratio of the monomer A:-monomer C is in the range of about 50–90:50–10.

10. A method according to claim 6, wherein said monomer A is polymerized with monomer B and monomer C, wherein monomer B is at least one monomer selected from the group consisting of glycidyl methacrylate, glycidyl acrylate, propylene glycol monoacrylate propylene glycol methacrylate, hydroxyethyl methacrylate, acrylonitrile and methacrylonitrile, wherein monomer C is at least one monomer selected from the group consisting of acrylic acid, methacrylic acid, lower alkyl esters of acrylic acid and methacrylic acid in which said alkyl has 1 – 4 carbon atoms, styrene, methyl styrene, vinyl toluene and vinyl acetate, and wherein the weight ratio of monomer A:monomer B:monomer C is in the range of about 60–90:20–1:20–1.

11. A method according to claim 6, wherein the polymerization reaction is effected by heating in the presence of a polymerization initiator.

12. A method according to claim 11, wherein the temperature for the polymerization reaction is in the range of about 70° – 110° C.

13. A method of manufacturing a non-aqueous resin dispersion, which comprises dissolving a resin selected from the group consisting of natural resins and natural resin-modified thermosetting resins in at least one monomer A, wherein said monomer A has the formula

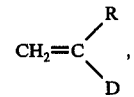

wherein R is hydrogen or $CH_3$, D is $-COOC_nH_{2n+1}$ or $-OC_nH_{2n+1}$ or and $n$ is an integer ranging from 6 to 20, and which can dissolve said resin, effecting polymerization reaction of the resulting solution whereby to form a polymer of said monomer A, and adding a non-aqueous solvent to the resulting polymer, said non-aqueous solvent being selected from the group consisting of aliphatic hydrocarbons and halogen derivatives thereof, said resin being substantially insoluble in said non-aqueous solvent, the weight ratio of said resin:said polymer being in the range of 5–50:50–95, said polymer being solvated in said non-aqueous solvent.

14. A method according to claim 13, which comprises adding to said solution during the course of the polymerization reaction at least one dispersant selected from the group consisting of waxlike substances and polyolefins having a softening temperature in the range of 60° – 130° C, wherein the amount of said dispersant added is in the range of 10 – 50 parts by weight per 100 parts by weight of said polymer, and quenching said solution after finishing the polymerization reaction.

15. A method according to claim 13, wherein said monomer A is polymerized with at least one monomer B selected from the group consisting of glycidyl methacrylate, glycidyl acrylate, propylene glycol monoacrylate, propylene glycol methacrylate, hydroxyethyl methacrylate, acrylonitrile and methacrylonitrile, wherein the weight ratio of monomer A to monomer B is in the range of about 70–99:30–1.

16. A method according to claim 13, wherein said monomer A is polymerized with at least one monomer C selected from the group consisting of acrylic acid, methacrylic acid, lower alkyl esters of acrylic acid and methacrylic acid wherein said alkyl has 1 – 4 carbon atoms, styrene, methyl styrene, vinyl toluene and vinyl acetate, wherein the weight ratio of monomer A:monomer C is in the range of 50–90:50–10.

17. A method according to claim 13, wherein said monomer A is polymerized with monomer B and monomer C, wherein monomer B is at least one monomer selected from the group consisting of glycidyl methacrylate, glycidyl acrylate, propylene glycol monoacrylate, propylene glycol methacrylate, hydroxyethyl methacrylate, acrylonitrile and methacrylonitrile, wherein monomer C is at least one monomer selected from the group consisting of acrylic acid, methacrylic acid, lower alkyl esters of acrylic acid and methacrylic acid in which said alkyl has 1 – 4 carbon atoms, styrene, methyl styrene, vinyl toluene and vinyl acetate, and wherein the weight ratio of monomer A:monomer B:monomer C is in the range of about 60–90:20–1:20–1.

18. A method according to claim 13, wherein the polymerization reaction is effected by heating in the presence of a polymerization initiator.

19. A method according to claim 18, wherein the temperature for the polymerization reaction is in the range of about 70° – 110° C.

20. A non-aqueous resin dispersion prepared by the method of claim 6.

21. A non-aqueous resin dispersion prepared by the method of claim 7.

22. A non-aqueous resin dispersion prepared by the method of claim 8.

23. A non-aqueous resin dispersion prepared by the method of claim 9.

24. A non-aqueous resin dispersion prepared by the method of claim 10.

25. A non-aqueous resin dispersion prepared by the method of claim 13.

26. A non-aqueous resin dispersion prepared by the method of claim 14.

27. A non-aqueous resin dispersion prepared by the method of claim 15.

28. A non-aqueous resin dispersion prepared by the method of claim 16.

29. A non-aqueous resin dispersion prepared by the method of claim 17.

* * * * *